UNITED STATES PATENT OFFICE.

MARTIN HERZBERG, OF OPLADEN, NEAR COLOGNE, GERMANY, ASSIGNOR TO SYNTHETIC PATENTS CO., INC., OF NEW YORK, N. Y., A CORPORATION OF NEW YORK.

AZO DYE.

1,160,406.      Specification of Letters Patent.      Patented Nov. 16, 1915.

No Drawing.      Application filed January 20, 1915. Serial No. 3,269.

*To all whom it may concern:*

Be it known that I, MARTIN HERZBERG, doctor of philosophy, chemist, citizen of the German Empire, residing at Opladen, near Cologne, Germany, have invented new and useful Improvements in Azo Dye, of which the following is a specification.

I have found that new and valuable disazo dyestuffs can be obtained by coupling the tetrazo compound of a para-diamin of the diphenyl series, e. g. dianisidin, benzidin, tolidin, diaminodiphenylamin, or its sulfonic acids, etc., in any course of succession on the one hand with a 2.5.7-aminonaphthol sulfonic acid compound, such as 2.5.7-aminonaphthol sulfonic acid, 2-phenyl- or ethylamino-5-naphthol-7-sulfonic acid, 2-amino-5-naphthol-1.7-disulfonic acid, such compounds having in general the nucleus

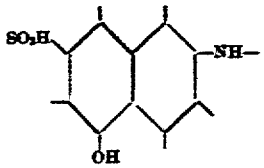

and on the other hand with such an amino substituted derivative of this acid as contains in the substituent a free amino group. As such components e. g. the following are suitable for being used: meta- or para-aminophenyl-2.5.7-aminonaphthol sulfonic acid, meta- or para-aminobenzoyl-2.5.7-aminonaphthol sulfonic acid, meta- or para-aminophenyl-naphthothiazole-5-oxy-7-sulfonic acid, para-aminophenyl-naphthimidazole-5-oxy-7-sulfonic acid, etc.

The new coloring matters are, after being dried and pulverized in the shape of their alkali metal salts generally dark powders soluble in water with a red to violet to blue coloration. They yield upon reduction with zinc powder and acetic acid a para-diamin, a 2.6-diamino-5-naphthol-7-sulfonic acid compound and a diamino substituted derivative of a 2.5.7-aminonaphthol sulfonic acid compound containing in the side chain a free amino group. They dye cotton from red to violet to blue shades which are rendered fast to washing by an after treatment with formic aldehyde.

In order to illustrate the new process more fully the following example is given, the parts being by weight:—12.2 parts of dianisidin are tetrazotized, the tetrazo compound is rendered alkaline and is then added to an alkaline solution of 17.8 parts of meta-aminophenylnaphtimidazole-5-oxy-7-sulfonic acid. The intermediate product separates. It is then added to an alkaline solution of 12 parts of 2-amino-5-naphthol-7-sulfonic acid. After stirring the mixture for one hour, the liquid is heated to 60° C., salted out, filtered off and dried. The coloring matter dyes cotton blue. It is after being dried and pulverized in the shape of its sodium salt a dark blue powder soluble in water with a blue coloration, having in a free state most probably the formula:

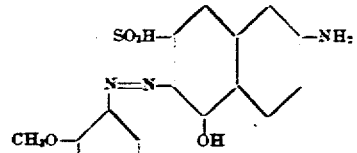
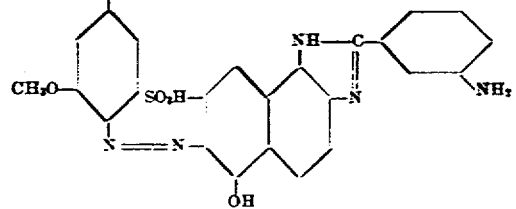

and yielding upon reduction with zinc powder and acetic acid dianisidin, 2.6-diamino-5-naphthol-7-sulfonic acid, meta-aminophenylnaphthimidazole-5-oxy-6-amino-7-sulfonic acid.

I claim:—

1. The herein described new disazo dyestuffs being obtainable from a para-diamin of the diphenyl series, a 2.5.7-aminonaphthol sulfonic acid compound and such an amino substituted derivative of this acid as contains in the substituent a free amino group, which dyes are after being dried and pulverized in the shape of their alkali metal salts generally dark powders soluble in water with a red to violet to blue coloration: yielding upon reduction with zinc powder and acetic acid a para-diamin, a 2.6-diamino-5-naphthol-7-sulfonic acid compound and a diamino substituted derivative of 2.5.7-aminonaphthol sulfonic acid compound containing in the side chain a free amino group; dyeing cotton from red to violet to blue shades which are rendered fast to washing by an after treatment with formic aldehyde, substantially as described.

2. The herein described new disazo dyestuffs being obtainable from a para-diamin of the dioxydiphenyl series, a 2.5.7-aminonaphthol sulfonic acid compound and such an amino substituted derivative of this acid as contains in the substituent a free amino group, which dyes are after being dried and pulverized in the shape of their alkali metal salts generally dark powders soluble in water with a red to violet to blue coloration; yielding upon reduction with zinc powder and acetic acid a dioxy-para-diamin, a 2.6-diamino-5-naphthol-7-sulfonic acid compound and a diamino substituted derivative of 2.5.7-aminonaphthol sulfonic acid compound containing in the side chain a free amino group; dyeing cotton from red to violet to blue shades which are rendered fast to washing by an after treatment with formic aldehyde, substantially as described.

3. The herein described new disazo dyestuffs being obtainable from a para-diamin of the diphenyl series, a 2.5.7-aminonaphthol sulfonic acid compound having in general the following nucleus

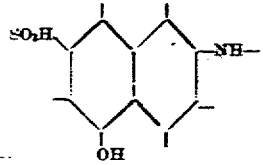

and such an amino substituted derivative of this acid as contains in the substituent a free amino group, which dyes are after being dried and pulverized in the shape of their alkali metal salts generally dark powders soluble in water with a red to violet to blue coloration; yielding upon reduction with zinc powder and acetic acid a para-diamin, a 2.6-diamino-5-naphthol-7-sulfonic acid compound having in general the following nucleus

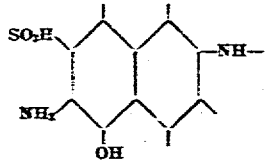

and a diamino substituted derivative of 2.5.7-aminonaphthol sulfonic acid compound containing in the side chain a free amino group; dyeing cotton from red to violet to blue shades which are rendered fast to washing by an after treatment with formic aldehyde, substantially as described.

4. The herein described new disazo dyestuffs being obtainable from a para-diamin of the diphenyl series, a 2.5.7-aminonaphthol sulfonic acid compound and such an amino substituted derivative of this acid as contains in the substituent an aminophenyl group, which dyes are after being dried and pulverized in the shape of their alkali metal salts generally dark powders soluble in water; yielding upon reduction with zinc powder and acetic acid a para-diamin, a 2.6 diamino-5-naphthol-7-sulfonic acid compound and a diamino substituted derivative of 2.5.7-aminonaphthol sulfonic acid compound containing in the side chain an aminophenyl group; dyeing cotton shades which are rendered fast to washing by an after treatment with formic aldehyde, substantially as described.

5. The herein described new disazo dyestuffs obtainable from a para-diamin of the dioxydiphenyl series, a 2.5.7-aminonaphthol sulfonic acid compound having in general the following nucleus.

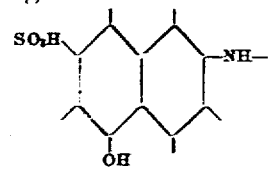

and such an amino substituted derivative of this acid as contains in the side chain an aminophenyl group, which dyes are after being dried and pulverized in the shape of their alkali metal salts generally dark powders soluble in water; yielding upon reduction with zinc powder and acetic acid a dioxy-para-diamin, a 2.6-diamino-5-naphthol-7-sulfonic acid, compound having in general the nucleus

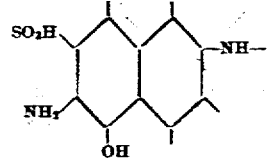

and a diamino substituted derivative of 2.5.7-aminonaphthol sulfonic acid compound containing in the side chain an aminophenyl group; dyeing cotton shades which are rendered fast to washing by an after treatment with formaldehyde, substantially as described.

6. The herein described new disazo dyestuff having in a free state most probably the formula:

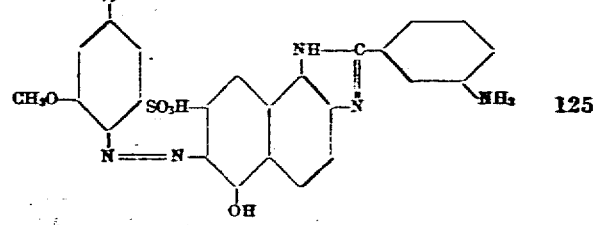

which is after being dried and pulverized in the shape of its sodium salt a dark blue powder soluble in water with a blue coloration; yielding upon reduction with zinc powder and acetic acid dianisidin, 2.6-diamino-5-naphthol-7-sulfonic acid, meta-aminophenyl-naphthimidazole-5-oxy-6-amino-7-sulfonic acid; and dyeing cotton blue shades which are rendered fast to washing by an after treatment with formic aldehyde, substantially as described.

In testimony whereof I have hereunto set my hand in the presence of two subscribing witnesses.

MARTIN HERZBERG. [L. S.]

Witnesses:
HELEN NUFER,
ALBERT NUFER.

Copies of this patent may be obtained for five cents each, by addressing the "Commissioner of Patents, Washington, D. C."

It is hereby certified that in Letters Patent No. 1,160,406, granted November 16, 1915, upon the application of Martin Herzberg, of Opladen, near Cologne, Germany, for an improvement in "Azo Dye," an error appears in the printed specification requiring correction as follows: Page 2, line 125, formula, for the symbol "$CH_2O$" read $CH_3O$; and that the said Letters Patent should be read with this correction therein that the same may conform to the record of the case in the Patent Office.

Signed and sealed this 29th day of February, A. D., 1916.

[SEAL.]

R. F. WHITEHEAD,

*Acting Commissioner of Patents.*

Cl. 8—1.